United States Patent Office 3,430,108
Patented Feb. 25, 1969

3,430,108
METHOD FOR THE MANUFACTURE OF TANTALUM POWDER FOR CONDENSER PURPOSES
Gustav Daendliker, Birsfelden, and Heini Fuerer, Basel, Switzerland, assignors to Ciba Limited, Basel, Switzerland, a company of Switzerland
Filed Mar. 29, 1966, Ser. No. 538,194
Claims priority, application Switzerland, May 26, 1965, 7,404/65
U.S. Cl. 317—230     4 Claims
Int. Cl. H01g 9/02

ABSTRACT OF THE DISCLOSURE

A new method is provided for manufacturing tantalum powders which are especially valuable for forming sintered anodes for electrolytic capacitors. In the method of this invention electrolytically obtained tantalum is hydrogenated, and the tantalum hydride obtained is ground into a powder containing a trace to 5% of particles of greater than 60 microns in diameter, 70–95% of the particles being 5–60 microns in diameter, and a trace to 30% of particles being less than 5 microns in diameter. The powder thus obtained is dehydrogenated to provide the tantalum powder of this invention.

---

It is known to use tantalum as an anode material for electrolytic condensers. However not all tantalum powders are suitable for the manufacture of sintered shapes for such electrolytic condensers. It is furthermore known that certain requirements have to be set as regards granule size, particle shape and purity if optimum results are to be obtained. The particle shape and the size distribution of the powder particles to a large extent determine the capacity achievable with the sintered shape, and the equivalent series resistance. On the other hand the view exists that the performance of condensers as regards current loss, breakdown voltage and long term performance is the better, the purer the starting material, that is to say the tantalum powder, or the sintered shape.

It has now been found that low leakage currents, high breakdown voltages and favourable long term performance are not only determined by chemical purity but evidently also by other properties, as is evident from the fact that powders of similar chemical composition but produced by different methods show different behaviour.

The present invention now relates to a method for the production of a tantalum powder which is suitable for the production of sintered anodes for electrolytic condensers which have high breakdown voltages, and is characterised by hydrogenating electrolytically deposited tantalum powder, optionally after a thermal vacuum purification, grinding it, selecting a powder mixture having a particle size distribution:

Percent:
  0–5 _____ $>60\mu$
  70–95 _____ $5–60\mu$
  0–30 _____ $<5\mu$ and dehydrogenating this mixture. The invention also relates to the use of a tantalum powder produced in this manner for the production of sintered anodes for electrolytic condensers and to the production of electrolytic condensers which contain such anodes.

The individual operations of hydrogenation, grinding, sorting out and dehydrogenation, as well as the thermal vacuum purification which is optionally carried out, may be carried out in a manner which is in itself known. Equally, the production of the anode and its incorporation into the electrolytic condensers takes place by measures which are in themselves known.

Figure 1:
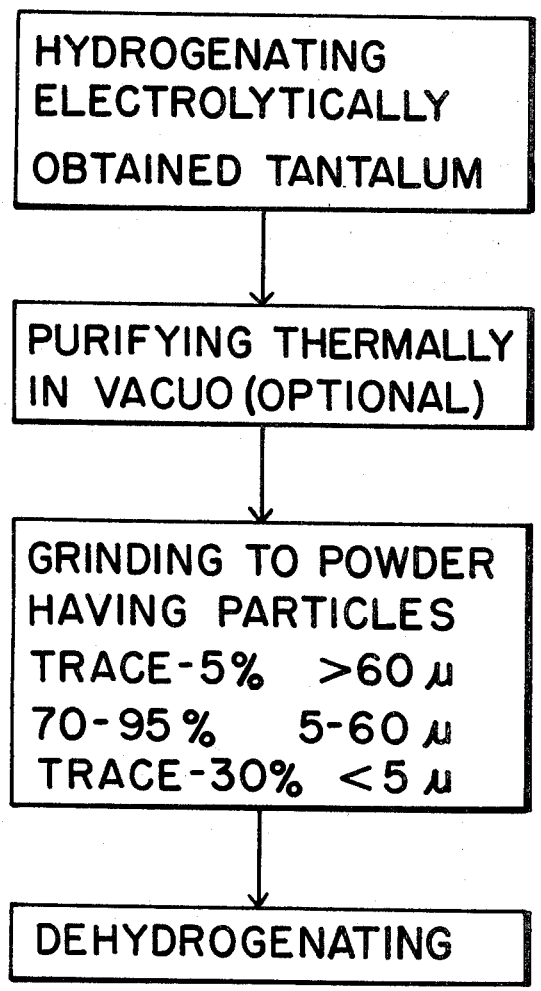

FIG. 1 is a flow diagram illustrating the process of the present invention.

Figure 2:
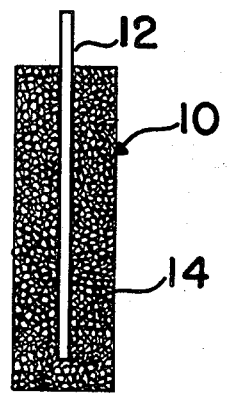

FIG. 2 is an enlarged cross sectional illustration of a typical sintered anode formed with the tantalum powder of this invention. The number 10 generally denotes the anode, having a lead wire 12, and a sintered tantalum body 14, comprised of the sintered-tantalum powder of this invention.

EXAMPLE 1

(a) Electrolytically deposited tantalum of high purity is first freed of adhering salt bath residues by leaching out in hydrogen peroxide solution. The dendritic material is then hydrogenated in known manner. The hydride is thereafter comminuted by appropriate means, for example in a tantalum-lined ball mill or roller mill. However, an ordinary steel ball mill may also be used provided the iron taken up during the grinding process is subsequently again dissolved out by means of hydrochloric acid. Other usable comminution methods use a vibratory ball mill.

The ground material is sieved through a sieve of mesh size $40\mu$. The coarse fraction is again subjected to the comminution operation and is again sieved. If necessary, the grinding and sieving process is repeated further. The material of particle diameter less than $40\mu$ is now dehydrogenated and used for the manufacture of condensers.

(b) Electrolytically deposited tantalum is, after leaching out as in (a), pressed into tablets and fired for 45 minutes at 1950 to 2000° in a vacuum of $<10^{-4}$ torr. After cooling, the tablets are hydrogenated and ground as described under (a).

A considerable purification of the material takes place during this sintering.

ANALYSIS
[Figures in parts per million]

| | Raw Material | Before Sintering | Sintered Tablets |
|---|---|---|---|
| O | | 150 | 75 |
| C | | 75 | 36 |
| Fe | | 17 | <1 |
| Ni | | 70 | 2 |
| Cr | | 5 | 1 |
| Al | | 12 | <1 |
| Si | | 5 | 1 |
| Ca | | 1 | 1 |

EXAMPLE 2

Characterisation of the powders prepared by the two methods (a) and (b) of Example 1.
Comparison with other types of powders:

Compact particles:
  I—According to Method (a).
  II—According to Method (b).
  III, IV—Carbothermally reduced tantalum, porous particles.
  V—Commercially available tantalum, porous leaflet-like structures.

CHEMICAL ANALYSIS OF THE POWDERS
[In parts per million]

| | I | II | III | IV | V |
|---|---|---|---|---|---|
| O | 1,400 | 1,430 | 1,330 | 1,770 | 1,250 |
| C | 72 | 58 | 23 | 36 | 78 |
| N | 98 | 92 | 20 | 26 | 116 |
| Fe | 2 | ~1 | <1 | 55 | 40 |
| Ni | 56 | ~1 | <1 | <1 | 1 |
| Cr | 18 | ~1 | <1 | <1 | <1 |
| Mg | <1 | <1 | <1 | <1 | 1 |
| Mn | <1 | <1 | <1 | <1 | <1 |
| Al | <1 | 7 | <1 | <1 | 7 |
| Si | 30 | <10 | <1 | <1 | 87 |
| Ca | 3 | 3 | 3 | <3 | 28 |
| Cu | <1 | <1 | <1 | <1 | <1 |

PHYSICAL CHARACTERISATION

|  | I | II | III | IV | V |
|---|---|---|---|---|---|
| Particle diameter by Fisher's method, μ | 7.4 | 6.1 | 12.6 | 8.8 | 6.7 |
| Apparent density by Scott's method, g./inch³ | 102 | 95 | 80 | 93 | 70 |
| Particle size, μ.: | | | | | |
| 75–250 percent | 0 | 0 | 18 | 4 | 14 |
| 40–75 do | 0 | 0 | 23 | 13 | 14 |
| 20–40 do | 43 | 34 | 30 | 18 | 10 |
| 5–20 do | 45 | 38 | 29 | 60 | 54 |
| <5 do | 12 | 28 | -------- | 5 | 8 |

Anodes (dimensions: φ, 6.8 mm.; length, 6.7 mm.) were pressed from these powders using 2% camphor as a lubricant. The lubricant is driven off in a vacuum furnace and the anodes thereupon sintered for 30 minutes at 2070 to 2100° C. The next table gives the dimensional changes and the electrical data on wet testing.

|  | I | II | III | IV | V |
|---|---|---|---|---|---|
| Weight | 2.15 | 2.13 | 1.87 | 1.91 | 1.74 |
| Initial density g./cm.³ | 8.9 | 8.8 | 7.8 | 8.0 | 7.5 |
| Sintered density | 10.6 | 11.2 | 8.2 | 9.1 | 9.0 |
| Shrinkage, percent diameter | 6.3 | 8.1 | 2.5 | 5.2 | 7.6 |
| Resistance [1] [2] | 11.4 | 14.6 | 7.9 | 8.3 | 10.4 |
| Loss current,[1] [3] 10⁻⁴ μ./μf., v | 1.24 | 2.15 | 3.0 | 20.3 | 10.4 |
| Breakdown voltage,[4] v | >285 | >285 | 220 | 230 | 220 |

[1] Measured with formed anodes in 10% $H_3PO_4$ at 25° C., forming in 0.01% $H_3PO_4$ to 200 v. at 90° C., 2 hours forming time.
[2] At 120 cycles per second and 0.5 v.
[3] At 140 v.
[4] In 1% $H_3PO_4$ at 90° C. Current limit 150 ma./anode.

These anodes were all converted to finished condensers by the same technique, using $MnO_2$ as the semiconductor electrode, and were then kept for 250 hours at 85° C. at their rated voltage. The following table shows the results.

Long term behaviour of finished condensers
Average values of 15 to 20 specimen
250 hours at rated voltage at 85° C.

|  | I | II [1] | III | | IV | | V | |
|---|---|---|---|---|---|---|---|---|
| Rated voltage, v.[2] | 35 | 50 | 50 | 35 | 50 | 35 | 50 | 35 50 |
| Capacity, μf | 27.4 | 13.4 | 4.3 | 33.2 | (³) | 33.2 | (³) | 26.2 (³) |
| Phase angle percent 1,000 cycles per second | 14.4 | 8.6 | 5.6 | 9.5 | (³) | 11.2 | (³) | 10.2 (³) |
| Loss current, μa.: | | | | | | | | |
| Beginning | 0.92 | 0.63 | 0.62 | 0.75 | (³) | 1.08 | (³) | 1.08 (³) |
| End | 0.71 | 0.63 | 0.99 | 1.10 | (³) | 1.20 | (³) | 1.68 (³) |

[1] This column gives data for smaller anodes, diameter 3.1 mm., weight about 0.55 g.
[2] Forming voltage for 50 v.—condensers, 270 v.; for 35 v.—condensers, 150 v.
[3] Cannot be produced.

The data show that:
(1) The condensers manufactured with the powders I and II of the invention show a considerably higher breakdown voltage than those prepared with the comparison powders, and therefore can be formed at higher voltages. Additionally the loss currents in wet electrolyte are less.

(2) The anodes manufactured with the powders of the invention can successfully be converted to 50 v. condensers, but the others cannot.

(3) High breakdown voltages and hence high voltage ratings in the finished condenser do not only depend on the purity of the powder but also on its method of manufacture.

We claim:
1. A method for producing tantalum powder for sintered anodes in an electrolytic capacitor comprising hydrogenating electrolytically obtained tantalum, grinding the tantalum hydride into a powder containing particles ranging from 5 microns to 60 microns in diameter, selecting a mixture, composed of the hydride particles, with a trace to 5% being greater than 60 microns in diameter, 70–95% from 5 to 60 microns in diameter and a trace to 30% less than 5 microns in diameter, and dehydrogenating said mixture to form the tantalum powder.

2. The method according to claim 1 wherein the tantalum hydride is purified thermally in vacuo before grinding.

3. The method for manufacturing sintered anodes for electrolytic condensers comprising forming said anodes from the tantalum powder obtained according to the method of claim 1.

4. An anode for an electrolytic capacitor comprised of sintered tantalum powder having a particle size distribution from 5 microns to 60 microns, with a trace to 5% being greater than 60 microns in diameter, 70–95% from 5 to 60 microns in diameter and a trace to 30% less than 5 microns in diameter.

References Cited

UNITED STATES PATENTS

| 2,299,228 | 10/1942 | Gray et al. | 317—230 |
| 2,461,410 | 2/1949 | Clark | 317—230 |
| 3,004,332 | 10/1961 | Werner | 317—230 |
| 3,166,693 | 1/1965 | Haring et al. | 317—230 |
| 3,302,073 | 1/1967 | Broodo | 317—230 |

JAMES D. KALLAM, *Primary Examiner.*

U.S. Cl. X.R.

75—200